(12) United States Patent
Taras et al.

(10) Patent No.: US 10,107,535 B2
(45) Date of Patent: Oct. 23, 2018

(54) PRESSURE SPIKE REDUCTION FOR REFRIGERANT SYSTEMS INCORPORATING A MICROCHANNEL HEAT EXCHANGER

(75) Inventors: Michael F. Taras, Fayetteville, NY (US); Alexander Lifson, Manlius, NY (US)

(73) Assignee: Carrier Corporation, Palm Beach Gardens, FL (US)

( * ) Notice: Subject to any disclaimer, the term of this patent is extended or adjusted under 35 U.S.C. 154(b) by 1467 days.

(21) Appl. No.: 13/395,548

(22) PCT Filed: Oct. 14, 2010

(86) PCT No.: PCT/US2010/052576
§ 371 (c)(1),
(2), (4) Date: Mar. 12, 2012

(87) PCT Pub. No.: WO2011/056371
PCT Pub. Date: May 12, 2011

(65) Prior Publication Data
US 2012/0167602 A1    Jul. 5, 2012

Related U.S. Application Data

(60) Provisional application No. 61/257,586, filed on Nov. 3, 2009.

(51) Int. Cl.
*F25B 49/02* (2006.01)
*F25B 1/10* (2006.01)
(Continued)

(52) U.S. Cl.
CPC ...... *F25B 49/02* (2013.01); *F25B 2341/0681* (2013.01); *F25B 2400/0411* (2013.01);
(Continued)

(58) Field of Classification Search
CPC ...... F25B 49/025; F25B 49/022; F25B 49/02; F25B 2600/021; F25B 41/04;
(Continued)

(56) References Cited

U.S. PATENT DOCUMENTS

| 4,879,879 A | 11/1989 | Marsala et al. |
| 5,224,354 A * | 7/1993 | Ito et al. ......................... 62/210 |

(Continued)

FOREIGN PATENT DOCUMENTS

| DE | 102007045765 A1 | 4/2008 |
| EP | 1452810 A1 | 9/2004 |

(Continued)

OTHER PUBLICATIONS

Search Report and Written Opinion dated Jun. 22, 2011 for PCT/US2010/052576.

*Primary Examiner* — Jianying Atkisson
*Assistant Examiner* — Meraj A Shaikh
(74) *Attorney, Agent, or Firm* — Carlson, Gaskey & Olds, P.C.

(57) ABSTRACT

A refrigerant system includes at least one compressor (54, 56) that compresses refrigerant and delivers it downstream to a heat rejection heat exchanger (26). The heat rejection heat exchanger is a microchannel heat exchanger. Refrigerant passes from the heat rejection heat exchanger downstream to an expansion device (60), from the expansion device through an evaporator (66), and from the evaporator back to the at least one compressor. A control (58) operates at least one compressor and the expansion device to reduce pressure spikes at transient conditions.

2 Claims, 2 Drawing Sheets

(51) Int. Cl.
*F25B 49/00* (2006.01)
*F25B 1/00* (2006.01)

(52) U.S. Cl.
CPC ..... *F25B 2400/075* (2013.01); *F25B 2500/07* (2013.01); *F25B 2500/26* (2013.01); *F25B 2600/026* (2013.01); *F25B 2600/0253* (2013.01); *F25B 2600/2513* (2013.01); *F25B 2700/1931* (2013.01); *Y02B 30/741* (2013.01)

(58) Field of Classification Search
CPC .... F25B 2400/075; F25B 1/10; F25B 31/008; F25B 2400/13; F04B 27/1804
USPC .. 62/228.4, 228.3, 228.1, 228.5, 197, 196.2, 62/196.1, 510
See application file for complete search history.

(56) References Cited

U.S. PATENT DOCUMENTS

| | | | |
|---|---|---|---|
| 5,806,324 A * | 9/1998 | Shaw | F04C 28/10 62/197 |
| 5,806,327 A | 9/1998 | Lord et al. | |
| 5,934,094 A * | 8/1999 | Itoh | B60H 1/3205 62/160 |
| 6,036,432 A | 3/2000 | Sishtia et al. | |
| 6,196,012 B1 | 3/2001 | Reason et al. | |
| 6,298,674 B1 | 10/2001 | Finkenberger | |
| 6,330,804 B1 | 12/2001 | Uno et al. | |
| 6,405,550 B1 | 6/2002 | Reason et al. | |
| 6,467,284 B1 | 10/2002 | Chen et al. | |
| 6,481,231 B2 | 11/2002 | Vogel et al. | |
| 6,543,242 B2 | 4/2003 | Reason et al. | |
| 6,745,584 B2 | 6/2004 | Pham et al. | |
| 7,261,151 B2 | 8/2007 | Memory et al. | |
| 7,487,826 B2 | 2/2009 | Pine et al. | |
| 7,665,318 B2 | 2/2010 | Jung et al. | |
| 2002/0092318 A1* | 7/2002 | Tipton | F25B 39/02 62/510 |
| 2002/0108388 A1* | 8/2002 | Wilson | B60H 1/3208 62/323.3 |
| 2004/0206109 A1 | 10/2004 | Nishiwaki et al. | |
| 2006/0249279 A1 | 11/2006 | Chordia et al. | |
| 2007/0074536 A1 | 4/2007 | Bai | |
| 2007/0295016 A1 | 12/2007 | Robin | |
| 2008/0307813 A1 | 12/2008 | Lifson et al. | |
| 2009/0038322 A1 | 2/2009 | Senf, Jr. et al. | |
| 2009/0095442 A1 | 4/2009 | Wiggs | |
| 2009/0113905 A1* | 5/2009 | Ericsson | F25B 41/006 62/126 |
| 2009/0241566 A1 | 10/2009 | Bush et al. | |
| 2009/0246062 A1 | 10/2009 | Holden | |
| 2009/8024265 | 10/2009 | Hong et al. | |

FOREIGN PATENT DOCUMENTS

| | | | |
|---|---|---|---|
| EP | 1493979 A1 * | 1/2005 | ............. F25B 9/008 |
| EP | 1493979 A1 | 1/2005 | |
| EP | 1559970 A2 * | 8/2005 | ............ F25B 49/005 |
| EP | 1559970 A2 | 8/2005 | |
| EP | 1598616 A2 | 11/2005 | |
| EP | 1717531 A1 | 11/2006 | |
| EP | 1806548 A1 | 7/2007 | |
| JP | 21290471 A | 11/1990 | |
| WO | WO2005/057095 A1 | 6/2005 | |
| WO | WO2005/057096 A1 | 6/2005 | |
| WO | WO 2005057096 A1 * | 6/2005 | ............. F25B 9/008 |
| WO | WO2006/034718 A1 | 4/2006 | |

* cited by examiner

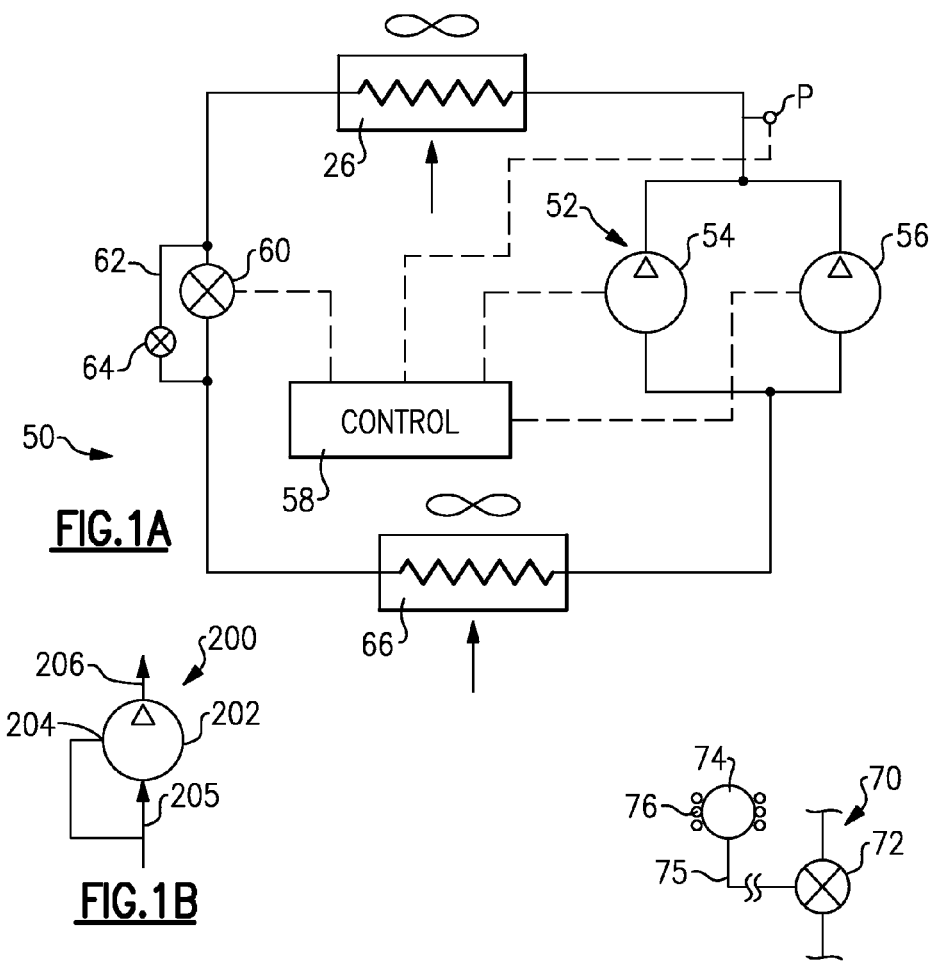
FIG.1A
FIG.1B
FIG.3
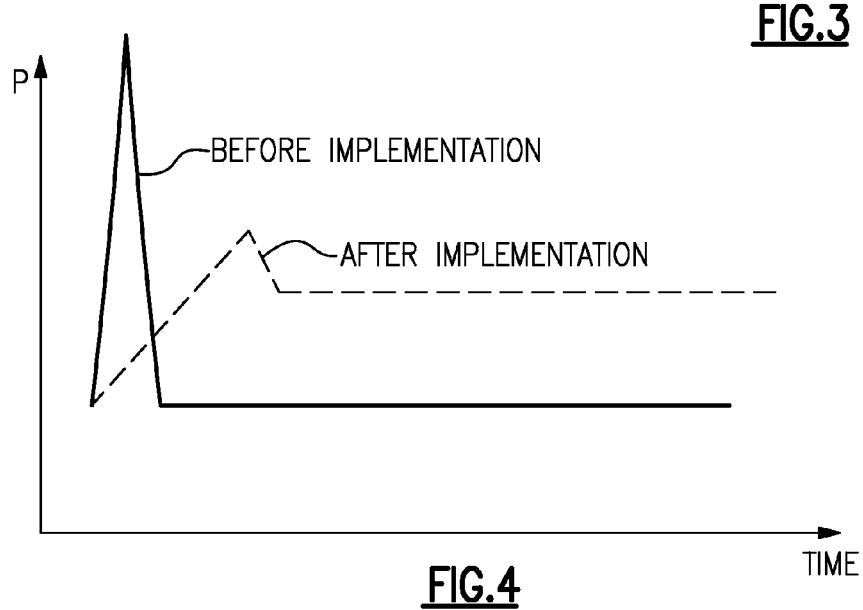
FIG.4

PRESSURE SPIKE REDUCTION FOR REFRIGERANT SYSTEMS INCORPORATING A MICROCHANNEL HEAT EXCHANGER

RELATED APPLICATION

This application claims priority to U.S. Provisional Patent Application No. 61/257,586, which was filed Nov. 3, 2009.

BACKGROUND OF THE INVENTION

The disclosed invention relates to a control that is operable at transient conditions to reduce pressure spikes in a refrigerant circuit incorporating a microchannel heat exchanger. In particular, the disclosed invention relates to a control that is operable at transient conditions to reduce pressure spikes in a refrigerant circuit incorporating a microchannel condenser or gas cooler.

In recent years, much interest and design effort has been focused on efficient and durable operation of the heat exchangers in refrigerant systems. One relatively recent advancement in heat exchanger technology is the development and application of parallel flow, or so-called microchannel or minichannel, heat exchangers (these terms will be used interchangeably throughout the text), as the indoor and/or outdoor heat exchangers.

These microchannel heat exchangers are provided with a plurality of parallel heat exchange tubes, typically of a non-round shape, among which refrigerant is distributed and flown in a parallel manner. The heat exchange tubes typically incorporate multiple channels and are orientated generally substantially perpendicular to a refrigerant flow direction in inlet, intermediate and outlet manifolds that are in flow communication with the heat exchange tubes. Heat transfer enhancing fins are typically disposed in between and rigidly attached to the heat exchange tubes. The primary reasons for the employment of the microchannel heat exchangers are related to their superior performance, high degree of compactness, structural rigidity, reduced refrigerant charge and enhanced resistance to corrosion.

Microchannel heat exchangers provide beneficial results, at least in part, because their internal flow channels are of quite small hydraulic diameter. However, there are also challenges associated with microchannel heat exchangers related to their small hydraulic diameter and substantial reduction in internal volume as compared to the conventional type of heat exchangers. One challenge is that a microchannel condenser or gas cooler is susceptible to pressure spikes at start-up or other transient conditions, such as operational regime changes.

When pressure spikes occur in such a refrigerant system, they can lead to nuisance shutdowns and eventually to an inability to control environmental parameters, such as temperature and humidity, in the space to be conditioned.

SUMMARY OF THE INVENTION

A refrigerant system includes at least one compressor that compresses refrigerant and delivers it downstream to a heat rejection heat exchanger. The heat rejection heat exchanger is a microchannel heat exchanger. Refrigerant passes from the heat rejection heat exchanger downstream to an expansion device, from the expansion device through an evaporator, and from the evaporator back to the at least one compressor. A control operates at least one compressor and/or the expansion device to reduce pressure spikes at transient conditions. A method of operating such a system is also disclosed.

These and other features of the present invention can be best understood from the following specification and drawings, the following of which is a brief description.

BRIEF DESCRIPTION OF THE DRAWINGS

FIG. 1A shows a circuit incorporating the present invention.

FIG. 1B shows another embodiment of the present invention.

FIG. 3 shows another embodiment of the present invention, in relation to the expansion device.

FIG. 4 shows a graph of the pressure spike reduction, in accordance to the present invention.

DETAILED DESCRIPTION OF THE PREFERRED EMBODIMENT

Figure 2A:
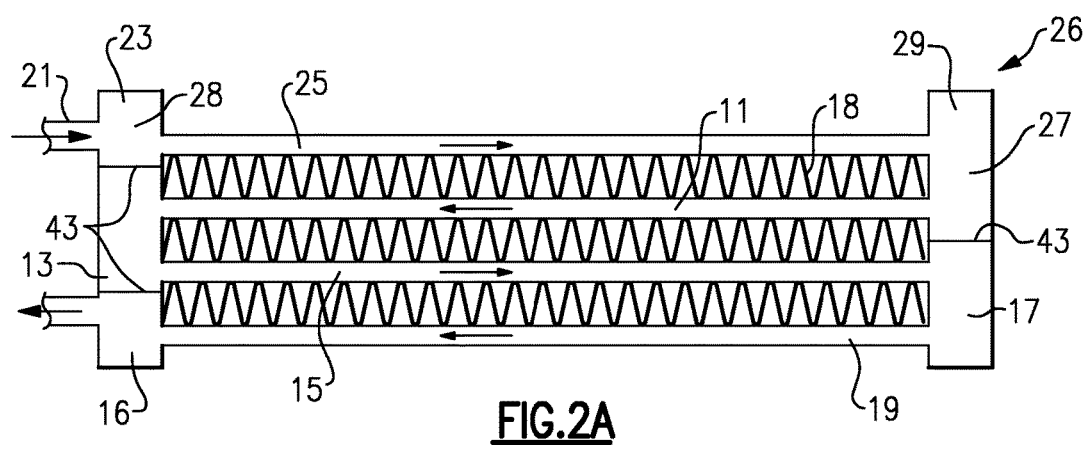
FIG. 2A shows an exemplary microchannel heat exchanger.

A refrigerant system 50 is illustrated in FIG. 1A incorporating a compressor bank 52 that is shown having tandem compressors 54 and 56. It should be understood that the refrigerant system 50 shown in FIG. 1 is the basic refrigerant system, and the refrigerant systems incorporating various options and features, known to a person skilled in the art, will equally benefit from the invention. Although tandem compressors are illustrated, a refrigerant system having a single compressor would also come within the scope of this invention. Similarly, more than two tandem compressors can be employed. The compressors 54 and 56 may be compressors having the ability to operate at several speeds or may incorporate other means of unloading. Control 58 operates to control the compressors 54 and 56. As an example, both compressors could be a two-speed compressor, or a multi-speed compressor such as a compressor having an electronically controlled motor which may be powered and controlled by pulse width modulation or other technique to operate at several distinct speeds. On the other hand, only one of the two compressors may be provided with such speed control.

The refrigerant compressed by the compressor bank 52 is delivered to a heat rejection heat exchanger 26. Heat rejection heat exchanger 26 is a microchannel condenser or a gas cooler, as will be better described below. Downstream of the heat rejection heat exchanger 26, the refrigerant passes through an expansion device 60. The expansion device 60 may be an electronic expansion device which is capable of being controlled to open to any number of varying positions after receiving commands from the control 58.

The expansion device 60 may also be a thermostatic expansion device, rather than an electronic expansion device. A bypass line 62 may bypass the expansion device to provide a refrigerant path around the expansion device 60. At system shutdown, the bypass line 62 can allow pressure equalization between the two sides of the expansion device 60, which can reduce pressure spikes at start-up or operational regime change. However, the bypass line 62 may also be provided with a valve, such as a solenoid valve 64 which may be controlled to open the bypass line.

Downstream of the expansion device 60 is an evaporator 66, and from the evaporator 66 the refrigerant returns to the compressor bank 52.

A sensor P is shown communicating to the control 58. This sensor can enhance the system operation to additionally alleviate a possibility of nuisance shutdown due to pressure spikes by providing direct indication of the instantaneous magnitude of the discharge pressure. The sensor P is exemplary of any number of locations of a pressure sensor (or other type sensor) in the refrigerant system 50. If the sensor P senses an unduly high pressure (or other undesirable condition), the control may determine it would be advisable to shut down the refrigerant system 50, such as by stopping one or both compressors 54 and 56. Such shutdowns can be important to preventing damage to the refrigerant system 50. However, as mentioned above, at transient conditions, "nuisance shutdowns" may often take place. The embodiments of this invention are directed to eliminating or significantly reducing the occurrence of such nuisance shutdowns.

As shown in FIG. 2, the microchannel heat exchanger 26 includes an inlet 21 fluidly connected and delivering refrigerant to an inlet chamber 23 of an inlet/outlet manifold 28. After leaving the inlet chamber 23 of the manifold 28, refrigerant passes into a first heat exchange tube bank 25 and to a first intermediate chamber 27 of an opposed intermediate manifold 29. From the first intermediate chamber 27 of the manifold 29, the refrigerant returns through a second heat exchange tube bank 11 to an intermediate chamber 13 of the manifold 28. From the intermediate chamber 13 of the manifold 28, refrigerant passes through a third heat exchange tube bank 15 back to a second intermediate chamber 17 of the intermediate manifold 29. From the second intermediate chamber 17 of the manifold 29, the refrigerant passes through yet another heat exchange tube bank 19 to an outlet chamber 16 of the manifold 28. As shown, divider plates 43 divide manifolds 28 and 29 into the chambers 23, 13, 16 and 27, 17 respectively. In addition, fins 18 are positioned between the heat exchange tube banks 25, 11, 15, and 19. It should be noted that a four-pass heat exchanger configuration is exemplary, and a different number of passes can be incorporated within the same heat exchanger construction. All these arrangements are within the scope of the invention.

Figure 2B:
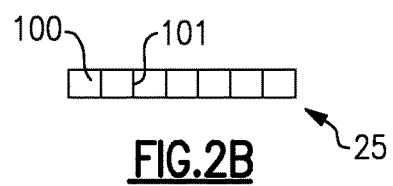
FIG. 2B is another view of an exemplary microchannel heat exchanger.

As shown in FIG. 2B, the heat exchange tubes of the tube banks typically include a plurality of small refrigerant channels 100 divided by separator walls 101. These channels typically have hydraulic diameter less than 3 mm, and preferably less than 1.5 mm. The channels can be any number of shapes, such as rectangular, triangular, trapezoidal, oval or circular, and the term "diameter" does not imply a circular cross-section.

The control 58 is operable to take any number of steps to reduce pressure spikes, such as may occur at system start-up. In addition, the control can take steps to reduce spikes under other transient conditions, such as a change of mode of operation, between cooling and dehumidification for example.

The control may start the refrigerant system 50 with only one of the two tandem compressors 54 or 56 operational, and with another compressor turned off. This would significantly reduce the pressure spike.

As shown in FIG. 1B, the compressor in the FIG. 1A system may be a compressor such as shown in the embodiment 200, wherein the compressor 202 has an inlet line 205 and an outlet line 206. A bypass or unloader line 204 selectively returns partially, or fully, compressed at least a portion of refrigerant back to the suction line 205. As known, a valve of some sort, or other control feature controls the return of this refrigerant. If such a compressor is utilized, the compressor can be run at least partially unloaded during transient conditions to reduce the volume of refrigerant being compressed, and thus address the pressure spike issues.

One known type of compressor which has the unloader feature is a scroll compressor wherein the two scroll elements are held together by a back pressure force. The back pressure force is reduced by a control to allow the two scroll members to move away from each other, and allow partially compressed refrigerant to return to a suction location.

The compressor example shown in FIG. 1B is highly schematic, and would cover the above-mentioned compressor, or any other type of compressor. The unloader or bypass line need not be outside of the compressor housing, and this bypass line or passage may be entirely positioned within the compressor housing, as is true in the above scroll compressor example. Should one of the compressors 54/56 be a compressor incorporating one of the unloading features, the control could start the refrigerant system with only this compressor operating, and with, for example, 20-70% unloading, such as for instance, pulse width modulation unloading.

A variable speed compressor can also be operated at a reduced speed, such as 20-40 Hz, at start-up and then gradually ramped upwardly to a full operational speed or desired operational speed. If one of the compressors is a multi-step or multi-speed compressor, the system can start up in an unloaded mode or at a lower speed and then gradually ramped-up to a full/desired operational speed or desired loaded condition. Further, the compressor motor can be provided with power electronics that allow for a slower start-up. Again, by operating the compressor at the lower speed, the flow of the refrigerant being compressed will be reduced, and thus the magnitude of the resulting pressure spikes will also be reduced.

To reduce the pressure spike, a conventional compressor, typically not equipped with any unloading capability, can be started through a series of a short on/off sequential cycles, to be sufficiently short to prevent pressure build up above the allowable threshold. Running the compressor with a cycling on/off mode will reduce the average refrigerant flow, and again reduce the magnitude of the resulting pressure spikes.

Generally, it is preferred that the system return to normal/desired operation within the time interval between 30 seconds and 2 minutes, depending on environmental conditions and thermal load demands.

The expansion devices can be operated to reduce pressure spikes, either as a stand-alone step, or in combination with the compressor controls. As an example, the refrigerant bypass or bleed passage 62 may actually be an orifice through the expansion device body 60. Such systems are known.

Solenoid valve 64 on refrigerant bypass line 62 can be opened for a short period of time (e.g. 15 seconds-1 minute) after start-up, or other transient, in order to prevent pressure build-up. The solenoid valve can be opened during normal operation as well, which would allow for a size reduction for the expansion device. By opening the bypass line, one effectively increases the size of the restriction in the expansion device. Thus, by opening the solenoid valve and an additional refrigerant path through the bypass line, the refrigerant flow restriction throughout the refrigerant system is greatly reduced, and the pressure spikes will also be reduced.

Alternatively, as shown in FIG. 3, a small electric heater 76 can be associated with a thermostatic expansion valve bulb 74. The bulb 74 of the thermostatic expansion device effectively serves as a way to provide feedback from a location downstream of the evaporator regarding the amount of superheat, or the temperature at the evaporator exit. In the embodiment shown, the bulb 74 provides pressure feedback through a line 75 back to the valve 72. An increase in pressure from the bulb 74 tends to open the valve 72. Thus, by providing the heater 76, and turning the heater on prior to the anticipated transient conditions, the valve opens and the amount of restriction is reduced.

Finally, an electronic expansion device may be utilized, and controlled to be at a more open condition at start-up, again allowing refrigerant migration prior to start-up, and lower hydraulic resistance during the start-up, thus reducing the pressure peak amplitude. An electronic expansion device is provided with an electronic control that achieves fine control of the positioning of the valve, and thus the amount of restriction. Again, by providing appropriate controls, one can drive the electronic expansion device to a position such that the restriction is reduced during the transient conditions, and the resulting pressure spikes are reduced as well.

With these combinations of controls, noticeable pressure spike reduction can be registered and is illustrated in FIG. 4. While FIG. 4 is not illustrating laboratory results, it is believed that it accurately illustrates how a system operating according to this application will function. As shown in FIG. 4, before the implementation of the mitigating measures, the pressure spike was much higher than after the mitigation measures were implemented. As can be seen in FIG. 4, the pressure spike caused the pressure to exceed the threshold value causing the unit to shutdown. As shown, the pressure after the shutdown equalized to the pressure before the shutdown. After the mitigating measures were implemented, while the pressure spike was still present, the value of the peak pressure never reached the unacceptable level. Consequently, after the pressure spike subsided, the unit continued to operate as expected, while the pressure on the discharge side during operation was higher then the pressure before the unit was started up.

The control may also have a feedback loop to prevent the pressure build up from exceeding the threshold value. For example, the control may adjust the compressor speed, or the opening of the expansion valve, or the time interval when to engage the second compressor, or the duration of the "off" portion of the cycle of the pulse width modulated compressor, based on the feedback obtained, for example, from the pressure sensor. For instance, if the discharge pressure, as determined by the pressure sensor, is rising quickly or approaching unacceptable upper limit, then the compressor speed is reduced, or the rate of the opening of the electronic expansion valve is increased, or the time interval between starting the second compressors is also increased. The control can also have self-learning features where, for example, if the pressure threshold is exceeded on the first start-up tripping the compressor, then on the subsequent start-ups, the control would control any of the unloading system features in such a way that the spike in pressure would not exceed the allowable threshold. Also, under certain conditions the system may be more prone to exceed the pressure threshold value, as for example, may occur on start-up at high ambient conditions, where the system pressure at standstill would be higher than at the lower ambient conditions. In this case, for example, the control would provide for higher degree of unloading on start-up to further minimize the spike in the discharge pressure.

The refrigerant systems that utilize this invention can be used in many different applications, including, but not limited to, air conditioning systems, heat pump systems, marine container units, refrigeration truck-trailer units, and supermarket refrigeration systems.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A refrigerant system comprising:
  at least one compressor, said compressor compressing refrigerant and delivering it downstream to a heat rejection heat exchanger, said heat rejection heat exchanger being a microchannel heat exchanger, an expansion device downstream of said heat rejection heat exchanger, and an evaporator downstream of said expansion device;
  a control for operating at least one of said at least one compressor and said expansion device to reduce pressure spikes at transient conditions;
  said control operates said at least one compressor to reduce pressure spikes at transient conditions;
  said at least one compressor is one of a variable speed compressor or a multi-speed compressor and is operated at least during a portion of the transient operation at a slower speed than during normal operation; and
  said compressor is generally operated at a slower speed for 30 seconds-2 minutes.

2. A refrigerant system comprising:
  at least one compressor, said compressor compressing refrigerant and delivering it downstream to a heat rejection heat exchanger, said heat rejection heat exchanger being a microchannel heat exchanger, an expansion device downstream of said heat rejection heat exchanger, and an evaporator downstream of said expansion device;
  a control for operating at least one of said at least one compressor and said expansion device to reduce pressure spikes at transient conditions;
  said control operates said expansion device to reduce pressure spikes; and
  said control of said expansion device at transient conditions occurs for 15 seconds-1 minute.

* * * * *